United States Patent Office 3,224,971
Patented Dec. 21, 1965

3,224,971
BORATE ESTERS AND LUBRICANT COMPOSITIONS CONTAINING SAID ESTERS
Edwin C. Knowles, Poughkeepsie, and Morris A. Wiley, Fishkill, N.Y., and Edward L. Kay, Akron, Ohio, assignors to Texaco Inc., New York, N.Y., a corporation of Delaware
No Drawing. Filed Mar. 27, 1962, Ser. No. 182,970
13 Claims. (Cl. 252—46.3)

This invention relates to novel intracomplexed borate esters and to lubricating compositions containing said novel reaction products. More particularly, it relates to the intracomplexed borate esters of boric acid and a bis(o-hydroxy-alkylphenyl) amine or sulfide and to lubricating compositions containing said esters.

The usefulness of many organo-boron compounds, for example, various borates as lubricating oil additives has been seriously hindered by their hydrolytic instability. A particular advantage of the boron compounds of the present invention is that they are hydrolytically stable, oxidation stable and thermally stable in both storage and use. In addition, these reaction products demonstrate increased load carrying ability when utilized in both synthetic and hydrocarbon mineral oils.

The present invention is concerned with these novel reaction products and with their use as lubricant additives. The novel compounds of the present invention are reaction products of boric acid and a bis(o-hydroxy-alkylphenyl) amine or sulfide. These compounds may be in the form of the acid, the ester, or the anhydride (diborate) and have the following general formulae:

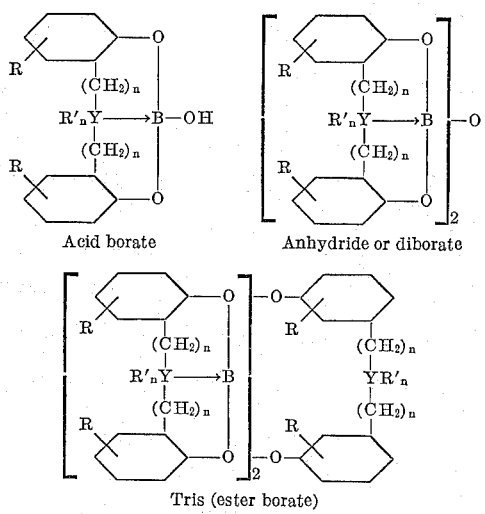

Tris (ester borate)

wherein R is hydrogen or an alkyl group containing 1 to 30 carbon atoms, R' is hydrogen or an alkyl group containing 1 to 30 carbons atoms, Y can be either nitrogen or sulfur and $n$ is an integer of 0 when Y is sulfur and 1 when Y is nitrogen. The load carrying properties of these reaction products are evidenced in lubricating oils when the products are present therein in a concentration usually between 0.05 to 5.0 weight percent. The simple hexagon employed in the formulas throughout the specification and in the claims below represents a fully unsaturated, aromatic benzene ring.

The compositions of the present invention are prepared by the reaction of a bis(o-hydroxy-alkylphenyl) amine or sulfide with boric acid to form the intracomplexed borate esters of the present invention. The preparation of the acid compounds of the present invention may be illustrated by the following general reaction:

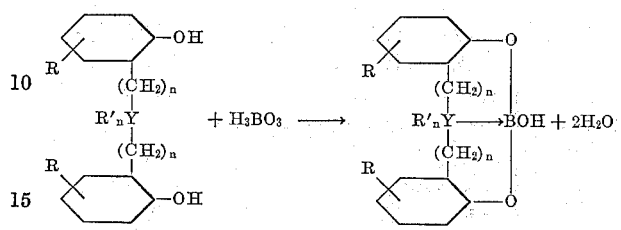

wherein R is hydrogen or an alkyl group containing 1 to 30 carbon atoms, R' is hydrogen or an alkyl group containing 1 to 30 carbons atoms, Y can be either nitrogen or sulfur and $n$ is an integer of 0 when Y is sulfur and 1 when Y is nitrogen.

The intracomplexed borate esters of the present invention may be utilized in either the acid or anhydride form. The anhydride is formed by reacting two mols of the acid one with the other. One mol of the anhydride and one mol of water are obtained as shown in the following equation:

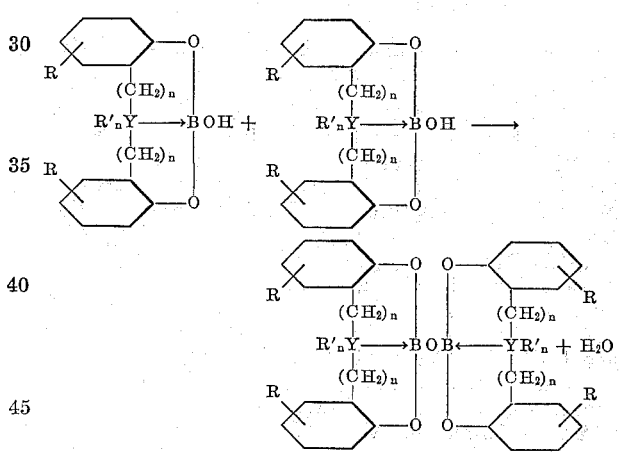

wherein R is hydrogen or an alkyl group containing 1 to 30 carbon atoms, R' is hydrogen or an alkyl group containing 1 to 30 carbon atoms, Y can be either nitrogen or sulfur and $n$ is an integer of 0 when Y is sulfur and 1 when Y is nitrogen.

The preparation of the specific novel reaction products of the present invention are illustrated in the following examples.

*Example 1.—Preparation of diborate of bis(o-hydroxy $C_{12}$–$C_{14}$ alkylphenylmethyl) amine*

61.8 grams, 1.0 mol, boric acid were reacted with 1.0 mol of bis(o-hydroxy $C_{12}$–$C_{14}$-alkylphenylmethyl) amine (583 grams of amine derivative with 292 grams of mineral oil diluent) in 100 mls. of xylene. The reaction mixture was refluxed at a temperature of 230° F. to remove 36 ml. of water and up to 375° F. to remove an additional 8 ml. of water. The solvent was stripped at a temperature of 482° F. and a clear amber viscous liquid was obtained which was identified on the basis of total water removed, 44 mls. (calculated 45 mls.) as the diborate of bis(o - hydroxy - $C_{12}$–$C_{14}$ - alkylphenylmethyl) amine the formula for which is:

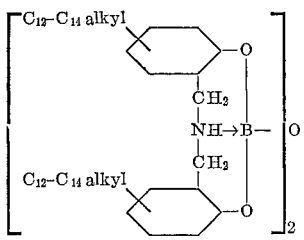

*Example 2.—Preparation of acid borate of bis(o-hydroxy-$C_{12-14}$-alkylphenyl) sulfide*

30.9 grams, 0.5 mol, boric acid were reacted with 299 grams, 0.5 mol of bis(o-hydroxy $C_{12}$–$C_{14}$ alkylphenyl) sulfide in 100 mls. of xylene. The reaction mixture was refluxed at a temperature of 230° F. until 18 mls. of water were collected. The solvent was stripped at a temperature of 428° F. and 311 grams of clear amber viscous liquid was obtained which was identified on the basis quantity of water removed 18 mls. (calculated 18 ml.) as acid borate of bis(o-hydroxy $C_{12}$–$C_{14}$-alkylphenyl sulfide), the formula for which is:

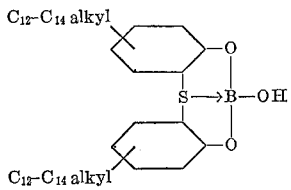

*Example 3.—Preparation of tris (borate ester) of bis(o-hydroxy-octylphenylmethyl) amine*

205 grams, 1.0 mol, of t-octylphenol and 23.4 grams, 0.166 mol, of hexamethylenetetramine was dissolved in 500 cc. of reagent grade xylene and refluxed for 24 hours. 20.6 grams, 0.33 mol of boric acid was then added and refluxed with heating being continued for an additional 4 hours until evolution of water had ceased (16 ml. collected). The resulting pale orange solution was filtered hot and then stripped at an elevated temperature and 1.0 mm. pressure. A viscous orange product was obtained which solidified on standing and had a melting point of about 300° F. This product was identified on the basis of water collected 16 ml. (calculated 18 ml.) as the tris (borate ester) of bis(o - hydroxy - octylphenylmethyl) amine, the formula for which is:

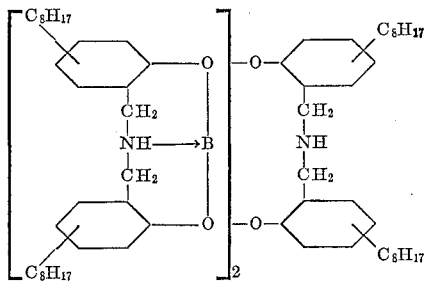

*Example 4.—Preparation of tris (borate ester) of bis(o-hydroxy-$C_{12-14}$ alkylphenylmethyl 2-ethylhexyl-amine)*

568 grams, 2.0 mols (basis hydroxyl No. ), of $C_{12}$–$C_{14}$ alkylphenol 129 grams, 1.0 mol, of 2-ethylhexyl amine and 42 grams, 0.667 mol, of boric acid were added together in a 5-liter flask chilled with an ice bath. 162 grams, 2.0 mols, of 37% formaldehyde solution was added dropwise over a period of 1 hour with stirring. The ice bath was withdrawn and heat applied with stirring at a temperature of 300° F. for 1 hour. The product was filtered and identified by elemental chemical analysis as tris (borate ester) of bis(o-hydroxy-$C_{12}$–$C_{14}$ alkylphenylmethyl) 2-ethylhexyl amine, the formula for which is:

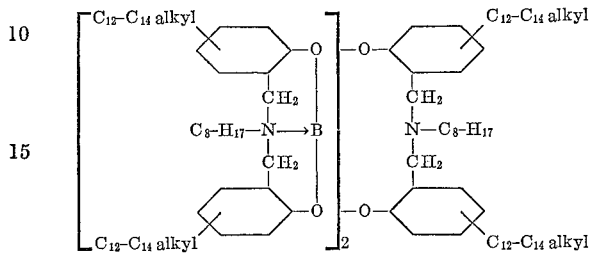

The lubricating oils of this invention include hydrocarbon lubricating oils and synthetic lubricating oils. The hydrocarbon oils found to be useful for this invention include oils having a viscosity in the range required for lubricating fluids and in particular hydrocarbon mineral oils which include paraffin base, napththene base, mixed paraffin-naphthene base and mineral oils of the residual or distillate type. The hydrocarbon lubricating base generally has been subjected to solvent refining to improve its oxidation and thermal stability and viscosity-temperature properties as well as solvent dewaxing to remove waxy components and to improve the pour properties of the oil. Broadly speaking, hydrocarbon lubricating oils having an SUS viscosity at 100° F. of between 50 to 2500 are used in the formulation of the improved lubricants of this invention.

The mineral lubricating oils to which the amine or sulfide reaction products of this invention are added usually contained other additives designed to impart desirable properties thereto. For example, viscosity index improvers such as the polymethacrylates having a molecular weight ranging from 500 to 25,000 are usually included therein. The VI improver normally used is a polymethacrylate having the following recurring structural unit:

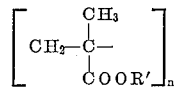

wherein R′ is an aliphatic radical ranging from butyl to stearyl and $n$ is an integer of more than 1.

The use of various metal base organic type additives has been found effective and are generally incorporated in the lubricating oils of this invention, particularly those oils used in high speed, spark ignition and diesel engines to reduce ring sticking, minimize lacquer formation and carbon deposits.

The hydrocarbon lubricating oils of this invention may also contain other useful additives such as metal sulfonates to afford additional detergent-dispersant properties, metal di-alkyl dithiophosphates to afford additional corrosion and oxidation resistance, anti-foam agents such as silicone polymers in the amounts of about 5 to 200 parts per million, etc.

The esters which constitute the synthetic lubricant composition of this invention are broadly described as esters of hydrocarbyl carboxylic acids. They are high molecular weight materials of lubricating oil characteristics derived from alcohols which are usually aliphatic alcohols containing one or more hydroxyl radicals and carboxyl radicals which are usually aliphatic carboxylic acids containing one or more carboxylic acid radicals.

Widely used synthetic ester lubricants are aliphatic diesters of aliphatic dicarboxylic acids containing 6–12 carbon atoms. From the standpoint of cost and availability, the preferred dibasic acids are adipic acid, sebacic acid and azelaic acid. The aliphatic alcohols used to form the diesters usually contain at least 4 carbon atoms and up to 20 or more carbon atoms. $C_6$ to $C_{18}$ alcohols are most commonly used. Ether alcohols such as Cellosolve and Carbitol may also be used in the formation of the aliphatic diesters of organic dicarboxylic acids used as the lubricating base in the compositions of this invention. Alcohols containing 2 or more hydroxyl radicals and no hydrogen substituted on the beta carbon atom such as trimethylol propane and pentaerythritol have proven particularly effective in formulating stable high temperature ester lubricants.

Examples of alkyl esters of aliphatic carboxylic acids are the following: di-isooctyl azelate, di-2-ethylhexyl sebacate, di-2-ethylhexyl azelate, di-2-ethylhexyl adipate, dilauryl azelate, di-sec-amyl sebacate, di-2-ethylhexyl alkenyl-succinate, di-2-ethoxyethyl sebacate, di-2-(2'-methoxyethoxy) ethyl sebacate, di-2-(2'-ethylbutoxy) ethyl sebacate, di-2-butoxyethyl azelate, di-2-(2'-butoxyethoxy) ethyl alkenyl-succinate, pentaerythritol tetracaproate and trimethylol propane tri-isooctanoate.

In addition to such esters, polyester lubricants formed by reaction of an aliphatic dicarboxylic acid, a dihydroxy compound and a monofunctional compound, which is either an aliphatic monohydroxy alcohol or an aliphatic monocarboxylic acid, in specified mol ratios are also employed as the synthetic lubricating base in the compositions of this invention; polyesters of this type are described in U.S. 2,628,974 on Polyester Synthetic Lubricants, which issued to R. T. Sanderson on February 17, 1953. Polyesters formed by reaction of a mixture containing specified amounts of 2-ethyl-1,3-hexanediol, sebacic acid, and 2-ethylhexanol and by reaction of a mixture containing adipic acid, diethylene glycol and 2-ethylhexanoic acid illustrate this class of synthetic polyester lubricating bases.

The sulfur analogs of the above-described esters are also used in the formulation of the lubricating compositions of this invention. Dithioesters are exemplified by di-2-ethylhexyl thiosebacate, di-n-octyl thioadipate and the dilaurate of 1,5-pentanedithiol; sulfur analogs of polyesters are exemplified by the reaction product of adipic acid, thioglycol and 2-ethylhexyl mercaptan.

Alkyl-substituted phenols are usually incorporated in the lubricants of the invention as anti-oxidants. The preferred and most commonly used alkyl phenol anti-oxidants are 2,6-di-tertiary butyl-4-methylphenol; 2,6-di-tertiary octylphenol; 2-6-di-tertiary amyl-4-methylphenol; and 2,6-di-isopropyl-4-methylphenol. Hindered phenols of this type are employed in concentrations between 0.1 and 2.0 weight percent.

Although hindered phenol type anti-oxidants are the most widely used anti-oxidants in the lubricant compositions of the invention, aryl-substituted amine anti-oxidants such as phenylnaphthylamines, phenylene diamine, phenothiazine, and diphenylamine are also used in lubricants in conjunction with the extreme pressure additive of the invention. The amine anti-oxidants are employed in the same concentrations as the hindered phenol anti-oxidants.

Organic silicones are normally incorporated in the lubricants of the invention to impart thereto anti-foam properties. The silicones are usually of the dialkyl or mixed alkylaryl silicone type. Dimethyl silicone is normally employed as the anti-foam agent. The silicone is incorporated in the lubricant by means of a kerosene concentrate containing 5 to 15 weight percent silicone. A very satisfactory antifoam agent is a kerosene concentrate 10 weight percent dimethyl silicone. The kerosene concentrate is employed in an amount sufficient to provide a silicone polymer concentration of from 1 to 100 parts per million based on the total lubricant composition.

To demonstrate the excellent improvement in load carrying ability afforded the lubricating oils containing the intracomplexed borate esters of this invention, a high speed gear scuff test was used. This test, called the Ryder Gear Test, is intended for the evaluation of the scuff-limited load-carrying ability of those lubricants used in reduction and accessory drives of turbo-jet and turbo-prop engines. The method of test provides for the running of two spur gears in a Pratt and Whitney Gear and Lubricant Tester (also termed the Ryder Gear Tester). The oil inlet temperature to the gears was 165°±5° F. The face width of the driven gear was 0.937 inch and the face width of the driving gear was 0.25 inch. The dynamometer speed of the gear tester was 3830 r.p.m. (equivalent to gear speed of 10,000 r.p.m.) and loading pressure of 2½ p.s.i. is applied during break-in. After running for 10 minutes the tester was shut down and the driving gear inspected and an estimate of the percentage of tooth area scuffed on each tooth of that gear was made. The above procedure was continuously repeated using a higher loading pressure with increments of 5 p.s.i. at each repetition until 22.5 percent of the total tooth face area on the driving gear had been scuffed, the load corresponding to this point being considered the scuff load. Scuffing is defined as that degree of wear or abrasion which obliterates the axial grinding marks on the gear tooth. The loading pressures used were as follows: 2, 5, 10, 15, 20, 25, 30, 35, 40, 45, 50, 55, 60, 65, 70, 75, 80 p.s.i. and up. A tooth load conversion factor of 18.5 sq. in., which was a constant calculated from measured data from the tester, was multiplied by the loading pressure at the scuff load and divided by the width of the driving gear (0.25 inch) to obtain the tooth load in pounds per inch. The results obtained using the above test procedure on various lubricating oil compositions including that of the invention are set forth in the following table:

TABLE I

| | |
|---|---|
| Base oil A | 1780 |
| Base oil A+1.0 wt. percent tris (borate ester) of bis(o-hydroxy-octylphenylmethyl)amine | 2235 |
| Base oil A+1.0 wt. percent tris (borate ester) of bis-(o-hydroxy-$C_{12}$-$C_{14}$ alkyl phenylmethyl octyl) amine | 2240 |

The above table indicates the improvements in the load carrying ability of the base oil containing the reaction products of the present invention. Base oil A was di-2-ethyl-hexyl sebacate.

The load carrying ability of compositions of the present invention is also demonstrated in the I.A.E. Gear Test which is one of the requirements of British Specification D.E.R.D. 2487, "Lubricating Oil, Aircraft Turbine Engines, Synthetic Type." The I.A.E. Gear Test is also designed to evaluate the scuff-limited, load-carrying ability of aircraft hydrocarbon lubricants.

The results of the I.A.E. Gear Test on lubricating compositions of the present invention are set forth in the following table. Base oil B consisted of a paraffin base crude which has been furfural refined, lightly acid treated, solvent dewaxed and has an SUS viscosity at 100° F. of 150:

TABLE II.—I.A.E. GEAR TEST

| | Tooth load, lbs. | Kin. vis. at— | |
|---|---|---|---|
| | | 100° F. | 210° F. |
| Base oil B | 20 | 27.4 | 4.71 |
| Base oil B plus 2.0 wt. percent diborate of bis-(o-hydroxy-$C_{12}$-$C_{18}$ alkylphenylmethyl) amine | 85 | 28.5 | 4.88 |
| Base oil B plus 2.0 wt. percent acid borate of bis-(o-hydroxy-$C_{12}$-$C_{14}$ alkylphenyl) sulfide | 65 | 29.1 | 5.02 |

Table II above further indicates an even greater improvement afforded the base oil by the addition of the borate reaction product of the present invention.

The excellent oxidation and corrosion stability of lubricating oils containing the borate reaction products of the present invention are demonstrated in the 347° F. Oxidation-Corrosion Test which is part of Specification MIL-L-7808D.

TABLE III.—347° F. OXIDATION-CORROSION TEST

| 72 hrs. at 347° F. | 100° F. kin. vis. inc., percent | Neut. No. inc., T.A.N. | Percent evap. loss |
|---|---|---|---|
| Base oil A | 70 | 18.7 | 4.8 |
| Base oil A plus 1.0 wt. percent tris(borate ester) of bis-(o-hydroxy-octyl-phenyl-methyl) amine. | +46 | 12.4 | 5.2 |
| Base oil A plus 1.0 wt. percent tris(borate ester) of bis-(o-hydroxy octyl-phenyl-methyl) amine plus 1.0 wt. percent phenothiazine. | +0.4 | 0.7 | 0.6 |
| MIL-L-7808D Specification | −5 to +15 | 2.0 max |  |

As shown by the test data in Table III above the viscosity increase and the neut. No. increase for this inhibited lubricant are well within the requirements of Specification MIL-L-7808D.

As is known in the art many organo borate compounds do not always perform as satisfactory additives for lubricant, greases, fuels and the like because of their hydrolytic instability and it is to this end that the borate reaction products of the present invention demonstrate at least another of their advantages. The borate reaction products of the present invention demonstrated hydrolytic stability in both water and lubricating oils.

We claim:
1. An intracomplexed borate ester selected from the group consisting of

(A)

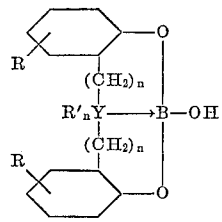

(B)

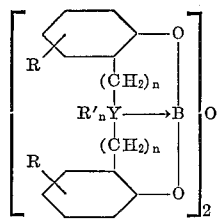

and (C)

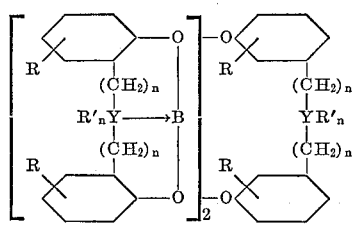

wherein R and R' are selected from the group consisting of hydrogen and an alkyl radical containing 1 to 30 carbon atoms, Y is selected from the group consisting of nitrogen and sulfur and $n$ is an integer of 0 when Y is sulfur and 1 when Y is nitrogen.

2. An intracomplexed borate ester as described in claim 1 wherein R and R' contain at least 6 to about 30 carbon atoms.

3. An intracomplexed borate ester having the formula:

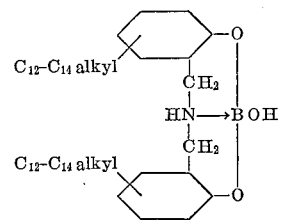

4. An intracomplexed borate ester having the formula:

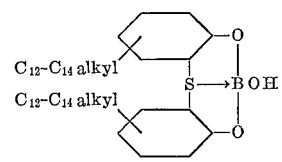

5. An intracomplexed borate ester having the formula:

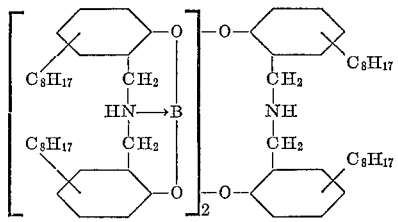

6. An intracomplexed borate ester having the formula:

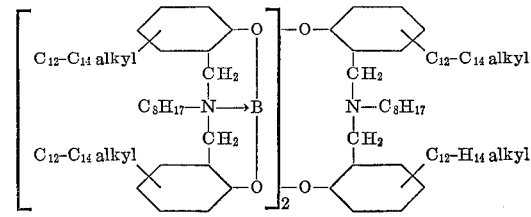

7. A lubricating oil containing an intracomplexed borate ester consisting of (A)

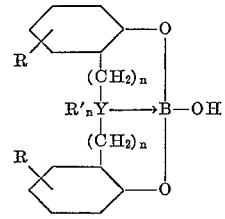

(B)

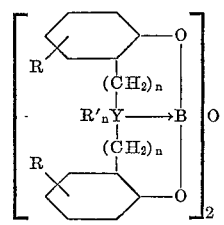

and (C)

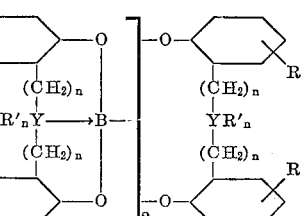

wherein R and R' are selected from the group consisting of hydrogen and an alkyl radical containing 1 to 30 carbon atoms, Y is selected from the group consisting of nitrogen and sulfur and $n$ is an integer of 0 when Y is sulfur and 1 when Y is nitrogen, said borate ester is present in an amount sufficient to improve the load carrying properties of said lubricating oil.

8. A lubricating oil as described in claim 7 wherein R and R' contain at least 6 to about 30 carbon atoms.

9. A lubricating oil as described in claim 7 wherein said borate ester is present in an amount of about 0.5 to 5.0 weight percent.

10. A lubricating oil as described in claim 7 wherein said borate ester is:

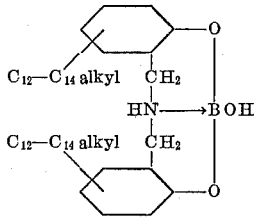

11. A lubricating oil as described in claim 7 wherein said borate ester is:

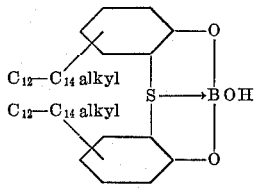

12. A lubricating oil as described in claim 7 wherein said borate ester is:

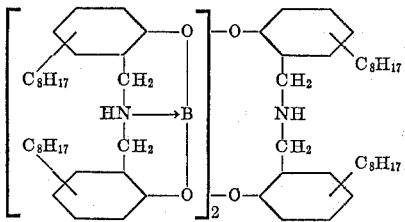

13. A lubricating oil as described in claim 7 wherein said borate ester is:

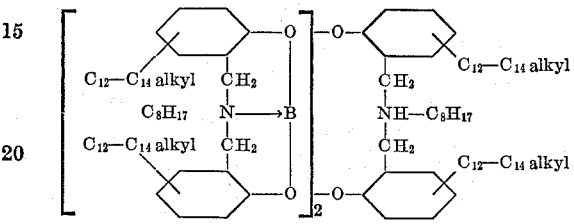

References Cited by the Examiner

UNITED STATES PATENTS 3,014,061  12/1961  Irish et al. _____ 252—49.6 X

FOREIGN PATENTS 864,840  4/1961  Great Britain.

DANIEL E. WYMAN, *Primary Examiner.*